United States Patent
Marx et al.

[11] 3,907,756
[45] Sept. 23, 1975

[54] MANUFACTURE OF POLYMERIC PRODUCTS

[75] Inventors: Matthias Marx, Bad Duerkheim;
Peter Dimroth, Ludwigshafen;
Wolfgang Batzill, Ludwigshafen;
Felix Miksovsky, Ludwigshafen, all of Germany

[73] Assignee: Badische Anilin- & Soda-Fabrik Aktiengesellschaft, Ludwigshafen (Rhine), Germany

[22] Filed: June 20, 1973

[21] Appl. No.: 371,775

[30] Foreign Application Priority Data
June 23, 1972 Germany............................ 2230679

[52] U.S. Cl.... 260/78.4 E; 260/86.1 N; 260/94.7 N
[51] Int. Cl........ C08f 3/64; C08f 3/70; C08g 33/02
[58] Field of Search..... 260/78.4 E, 78.4 A, 86.1 N, 260/94.7 N, 89.5 S, 78.4 D

[56] References Cited
UNITED STATES PATENTS
3,806,498    4/1974    Wilson et al.................. 260/94.2 R

*Primary Examiner*—Joseph L. Schofer
*Assistant Examiner*—Maria S. Tungol
*Attorney, Agent, or Firm*—Johnson, Keil, Thompson & Shurtleff

[57]  ABSTRACT

Manufacture of polymeric products. Mixtures of (I) at least one compound containing at least two aziridine groupings per molecule and (II) at least one compound containing at least one ester grouping of the general formula:

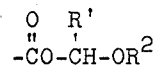

where $R^1$ is methyl and $R^2$ is hydrogen, $C_{1-18}$ alkyl, $C_{5-10}$ cycloalkyl or aryl, are reacted at temperatures of between 50°C and 150°C. The process is particularly suitable for the manufacture of surface coatings.

12 Claims, No Drawings

MANUFACTURE OF POLYMERIC PRODUCTS

The present invention relates to the manufacture of polymeric products from mixtures of aziridine compounds and substances containing ester groups.

German Pat. Nos. 901,844 and 907,943 disclose processes in which film-forming materials are treated with substances containing at least two alkylene imine groups.

Furthermore, U.S. Pat. Nos. 3,017,280; 3,198,770; 3,507,837; 3,549,378 and 3,507,839, Belgian Pat. Nos. 702,436 and 708,173 and Japanese Patent Application No. 20,638/66 disclose the reaction of carboxyl-containing substances with polyaziridinyl compounds. However, these mixtures of carboxyl-containing substances and polyaziridine compounds are not stable on storage.

It is an object of the present invention to provide a process in which the pot life may be controlled in a desired manner and thus improved processability achieved using mixtures containing stable polyaziridine compounds.

The present invention relates to a process for the manufacture of polymeric products from mixtures of aziridine compounds and substances containing ester groups and is characterized in that mixtures of I. at least one compound which contains, per molecule, at least two aziridine groupings of the general formula

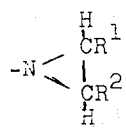

where
R$^1$ and R$^2$ may be the same or different and are hydrogen or straight-chain or branched-chain alkyl of from 1 to 4 carbon atoms, and II. at least one compound containing at least one ester grouping of the general formula:

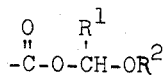

where
R$^1$ is C$_{1-4}$ straight-chain or branched-chain alkyl and R$^2$ is straight-chain or branched-chain alkyl, cycloalkyl or substituted or unsubstituted aryl, are reacted at temperatures of from 0° to 180°C.

The mixtures used in the process of the invention show good stability on storage. On the other hand, the process of the invention makes it possible to adjust the pot life to a desired value to facilitate processing. This may be done, for example, by exceeding a specific temperature limit dependent to a certain extent on the components (I) and (II), in which case polymeric products of valuable properties are formed.

The following remarks relate to the components making up the mixture used in the process of the invention.

I. Suitable aziridine compounds are low molecular weight and polymeric compounds containing, per molecule, at least two aziridine groupings of the general formula

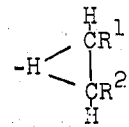

where
R$^1$ and R$^2$ may be the same or different and are hydrogen or straight-chain or branched-chain C$_{1-4}$ alkyl. Examples of suitable aziridine compounds are as follows:

1. Compounds which have the following formula:

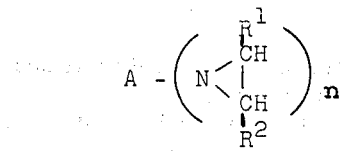

where
$n$ is 2 or 3,
R$^1$ and R$^2$ have the meanings stated above and A denotes alkyl, aryl, aralkyl or a cycloaliphatic or heterocyclic radical having a valency corresponding to the value of $n$, for example

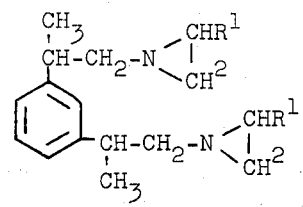

or

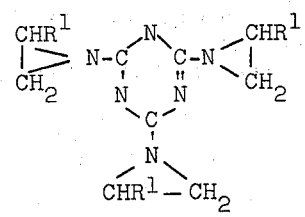

where
each R$^1$ is methyl or, preferably, hydrogen;

2. Compounds of the general formula:

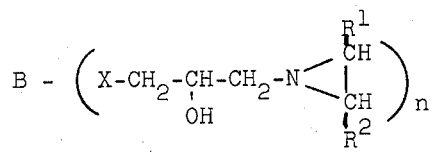

where
R$^1$ and R$^2$ have the meanings stated above,
$n$ is an integer of from 1 to 6,
B is alkyl, aryl, aralkyl or a cycloaliphatic or heterocyclic radical or a polyalkylene glycol ether group of from 1 to 50 units and
X denotes oxygen, sulfur or nitrogen, if present; for example

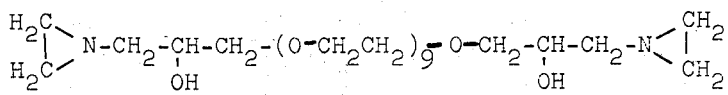

3. Compounds of the general formula

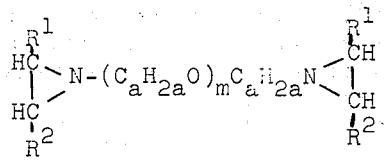

where
R$^1$ and R$^2$ have the meanings stated above and
$a$ is an integer of from 2 to 4 and
$m$ is an integer of from 1 to 50, for example:

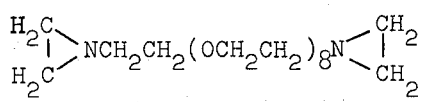

4. Compounds of the general formula:

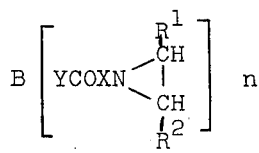

where
R$^1$ and R$^2$ have the meanings stated above,
$n$ is an integer of from 2 to 6,
X is straight-chain or branched-chain alkylene of from 2 to 6 carbon atoms,
B is alkyl, aryl, aralkyl or a cycloaliphatic or heterocyclic radical or a polyalkylene glycol ether of from 1 to 50 units and
Y is oxygen, sulfur or nitrogen or an NH-group, for example

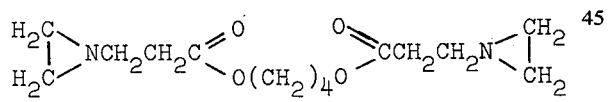

and

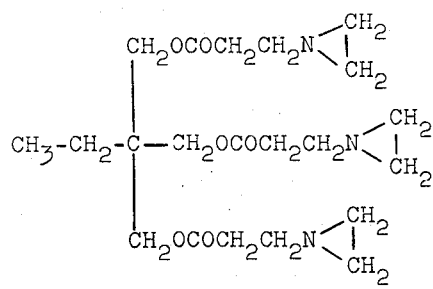

5. Compounds of the general formula:

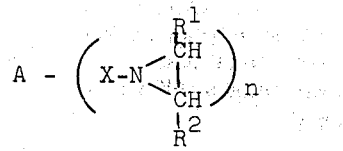

where
R$^1$ and R$^2$ have the meanings stated above,
$n$ is an integer of from 2 to 6,
X is one of the groupings —NHCO—, —CO—, —SO$_2$— and —O—CO— and
A is alkyl, aryl, aralkyl or a cycloaliphatic or heterocyclic radical having a valency corresponding to the value of $n$, for example:

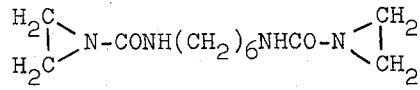

6. Compounds of the general formula:

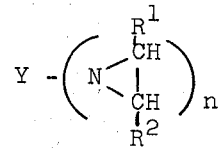

where
R$^1$ and R$^2$ have the meanings stated above,
Y is a divalent —CO—, —SO$_2$— oder —SO— radical or a boron, P=S— or P=O— radical of higher valency, and
$n$ is accordingly 2 or 3, for example:

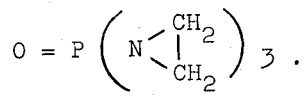

Mixtures of the above aziridinyl compounds and polymers and polycondensates containing aziridinyl groups are also suitable.

The formula of the following structure

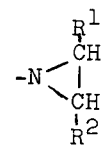

embraces, as mentioned above, both substituted and unsubstituted aziridines.

Suitable aziridines of the above kinds are described, for example, in U.S. Pat. Nos. 3,157,607; 3,171,826; 3,182,040; 3,198,770; 3,295,916; 3,316,210; 3,337,533; 3,378,535; 3,393,184; 3,507,837; 3,549,378; 3,507,839; 2,596,200; 3,197,463; German Published Applications Nos. 1,494,290; 1,444,275; 1,270,389; 1,209,097 and 1,470,321; German Pat. Nos. 880,740 and 872,037; French Pat. No. 1,427,431; Belgian Pat. Nos. 708,173; 702,436; 650,991 and 646,325, and; U.K. Pat. Nos. 1,054,635 and 1,003,385.

II. These compounds contain at least one ester grouping of the general formula:

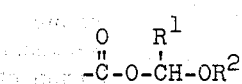

where $R^1$ is straight-chain or branched-chain $C_{1-4}$ alkyl and
$R^1$ is straight-chain or branched-chain $C_{1-4}$ alkyl and $R^2$ is straight-chain or branched-chain alkyl, cycloalkyl or unsubstituted or alkylsubstituted aryl, and particularly suitable compounds of this class are low molecular weight and high molecular weight compounds containing α-alkoxy ester groups and α-aryloxy methyl ester groups. Preferred compounds of this kind are these containing the grouping

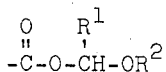

in which
$R^1$ is methyl and
$R^2$ is hydrogen, straight-chain or branched-chain alkyl of from 1 to 18 and in particular of from 1 to 4 carbon atoms, cycloalkyl of from 5 to 10 carbons or unsubstituted or substituted aryl, which may be polynuclear.

Particularly advantageous compounds for use as component (II) are those containing the radical

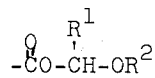

attached to polymers, polycondensates or polyadducts, which may optionally contain further functional groups such as hydroxyl, amide, N-methylolamide and N-methylolamide ether groups. Also suitable are low molecular weight compounds containing two or more of said ester groupings (II) such as di-(1-methyl-2-oxabutyl) maleate, di-(α-ethoxyethyl) adipate or polymers containing polymerized units of α-ethoxyethyl acrylate, α-ethoxy metharylate or butyl-α-ethoxyethyl maleate, or linear or branched polyester containing the radical

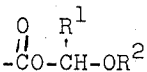

as a terminal or lateral group. Mixtures of compounds mentioned under (II) are also suitable.

The mixtures to be used in the process of the invention generally contain components I and II in such quantities that the groups

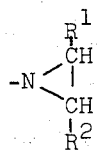 and 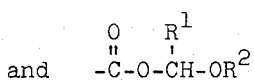

are present in approximately equivalent amounts, although one of the components may be present in an amount which is greater or less than the equivalent amount, conveniently to an extent of up to above 20 equivalent %.

For the preparation of high molecular weight polymeric products as used in the present invention, it is convenient to start from equimolar amounts of a di-aziridine (I) and a diester (diacylal II) of the kind proposed in the present invention. Small amounts of a trifunctional component lead to branched-chain or crosslinked polymers, whilst the presence of a mono-aziridine and/or monoacylal gives rise to polymers of lower molecular weight, so that these compounds may be used for controlling the degree of polymerization.

Reaction of the aziridines with the said specified esters is generally carried out at temperatures of between 0° and 180°C and preferably at from 50° to 150°C. The temperature at which the reaction is carried out may be lowered by adding catalysts, for example strong acids such as phosphoric acid or perchloric acid.

The reaction may be carried out in the presence or absence of solvents. The presence of solvent such as usual organic solvents, e.g. alcohols, esters, ketones, lactomas, lactones and aromatics, or conventional plasticizers such as phthalates, decelerates the reaction, and the reaction is also slowed down by the presence of inert liquid or solid diluents.

The reaction between aziridine and acylal groups may also be carried out for the purpose of crosslinking polymeric materials, for example by reacting polymers having lateral acylal groups together with a low molecular weight difunctional or polyfunctional aziridine compound, for example with butanediol-di- [β-(ethylene-imino)propionate ]:

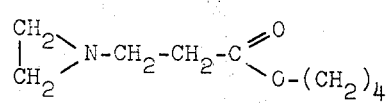

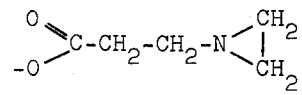

or with trimethylolpropane-tris- [β-(N-ethylene-imino)propionate ]:

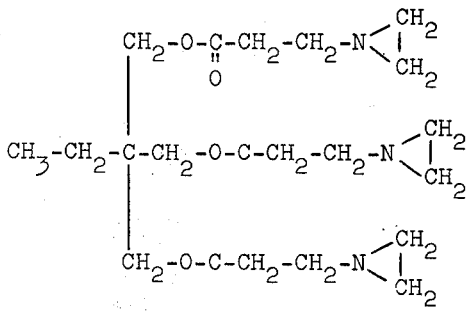

The aziridine groups can, or course, form an integral part of the macromolecule. Crosslinked products having very similar properties are obtained if the starting materials used are polymeric aziridine compounds and low molecular weight diacylals or polyacylals as crosslinkers. Of course, both types of reactive group may be present in the same macromolecule.

The polymers of the invention may be used either alone or in conjunction with other conventional synthetic or natural binders as construction material, components in laminates, fibers sheeting, foams, sealants, adhesives and as wall material for encapsulating solid or liquid substances.

Other fields of application are open to the novel polymers in that they can be processed in organic or aqueous solutions or dispersions to form adhesive or non-adhesive coatings or impregnations on plastics materials, mineral materials (stone, glass, etc.), wood, textiled leather, paper and synthetic substitutes for said materials.

The manufacture of polymeric materials by the process of the invention has the advantage that the mixture of starting components is stable on storage and that the pot-life may be regulated by selecting a specific temperature limit.

The process of the invention is also particularly suitable for the manufacture of surface coatings, and any of the pigments, fillers, flow promoters and other auxiliaries normally used in the paint industry and also any other conventional binders may be used in conjunction with the novel polymers.

In the following Examples the parts and percentages are by weight.

EXAMPLE 1

A mixture of 26 parts of di-(1-methyl-2-oxabutyl) maleate and 25.2 parts of butanediol-1,4-di-[β-(N-ethylene-imino)propionate] is heated to 50°C. After 45 minutes there has formed a tough material which is resistant to solvents.

EXAMPLE 2

A mixture of 29 parts of di-(α-ethoxyethyl) adipate, 37 parts of 4,4'-diethylene-urea-3,3'-dimethyl-dicyclohexyl-2,2-propane and 3 parts of trimethylolpropane-tris-[β-(N-ethylene-imino)-propionate] is adjusted to a viscosity of 0.5 poise with a 1:1 mixture of isopropanol and dimethylformamide and is then sprayed onto leather to form a thin layer thereon. After a short airing period the assembly is dried at 100°C for 3 minutes. There is formed a solvent-resistant, wear-resistant and crease-resistant coating which is particularly suitable for the easy-care finishing of leathers.

EXAMPLE 3

20 parts of a 50% xylene solution of a copolymer of 45 parts of styrene, 10 parts of 2-ethylhexyl acrylate, 30 parts of methyl methacrylate and 10 parts of α-ethoxyethyl acrylate are mixed with 4.5 parts of 1,3,5-tris-[ω-(N,N-ethyleneurea)hexamethylene]biuret. The mixture is diluted with 15 parts of a mixture of equal parts of isopropanol and butyl acetate, and 10 parts of titanium dioxide pigment (RN 57 of Titangesellschaft) are added and the whole is homogenized for 8 hours in a ball mill. The resulting white liquid varnish is stable for more than 6 months.

After application to degreased steel plate in a thickness of 15μ (dry thickness) and drying for 30 minutes at from 60° to 100°C there is obtained a hard, glossy and deformable coating. Some of the results of tests carried out on this coating are listed in the following Table:

| Drying treatment | Appearance | Hardness DIN 53152 | Deformability DIN 53156 | Solubility in acetone |
|---|---|---|---|---|
| 30'/60°C | white, glossy | 86 | 10.6 | slightly soluble |
| 30'/80°C | white, glossy | 126 | 8.1 | insoluble |
| 30'/100°C | white, glossy | 146 | 7.2 | insoluble |

We claim:

1. A process for the manufacture of polymeric products from mixtures of aziridine compounds and substances containing ester groups, wherein mixtures of I. at least one compound containing, per molecule, at least two aziridine groupings of the general formula:

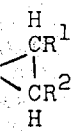

wherein
$R^1$ and $R^2$ are the same or different and are hydrogen or straight-chain or branched-chain alkyl of from 1 to 4 carbon atoms, and II. at least one compound containing an ester grouping of the general formula:

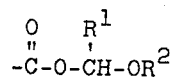

where
$R^1$ is straight-chain or branched-chain alkyl of from 1 to 4 carbon atoms and
$R^2$ is hydrogen, straight-chain or branched-chain alkyl, cycloalkyl, aryl or substituted aryl, said compound II being selected from the group consisting of di-(1-methyl-2-oxabutyl) maleate, di-(α-ethoxyethyl) adipate, polymers containing polymerized units of α-ethoxyethyl acrylate, α-ethoxy metharylate or butyl-α-ethoxyethyl maleate, and linear or branched polyester containing the radical

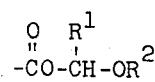

as a terminal or lateral group and mixtures thereof, are reacted at temperatures of from 0° to 180°C, said groupings being present in approximately equivalent amounts.

2. A process as claimed in claim 1, wherein the mixtures of components (I) and (II) are reacted at temperatures of from 50° to 150°C.

3. A process as claimed in claim 1, wherein the mixtures of components (I) and (II) are reacted in the presence of conventional organic solvents with the addition of small amounts of strong acids.

4. A process as claimed in claim 1, wherein the component (I) used is at least one compound of the general formula:

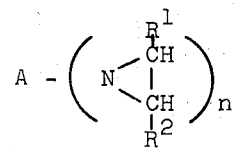

where
$n$ is 2 or 3 and
A denotes alkyl, aryl, aralkyl or a cycloaliphatic or heterocyclic radical having a valency corresponding to the value of $n$.

5. A process as claimend in claim 1, wherein the component (I) used is at least one compound of the general formula:

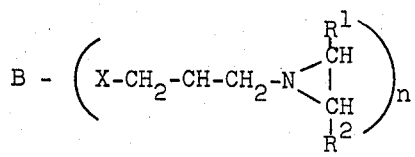

where
- $n$ is an integer of from 1 to 6,
- B is alkyl, aryl, aralkyl or a cycloaliphatic or heterocyclic radical or a polyalkylene glycol ether group containing from 1 to 50 units, and
- X is oxygen, sulfur or nitrogen.

6. A process as claimed in claim 1, wherein the component (I) used is at least one compound of the general formula:

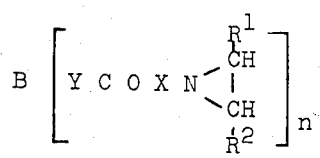

where
- $n$ is an integer of from 1 to 6,
- B is alkyl, aryl, aralkyl or a cycloaliphatic or heterocyclic radical or a polyalkylene glycol ether of from 1 to 50 units,
- X is straight-chain or branched-chain alkylene of from 2 to 6 carbon atoms and
- Y is oxygen, sulfur or nitrogen or an NH-group.

7. A process as claimed in claim 1, wherein the component (I) used is at least one compound of the general formula:

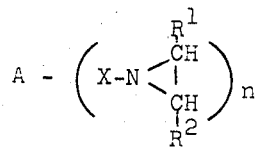

where
- $n$ is an integer of from 2 to 6,
- X is one of the groupings —NHCO—, —CO—, —SO₂— and —O—CO— and
- A is alkyl, aryl, aralkyl or a cycloaliphatic or heterocyclic radical having a valency corresponding to the value of $n$.

8. A process as claimed in claim 1, wherein the component (I) used is at least one compound of the general formula:

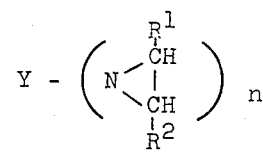

where
$n$ is 2 or 3 and Y stands for a divalent —CO—, —SO₂— or —SO— radical or for a trivalent P=S—, P=O— or boron radical.

9. A process as claimed in claim 1, wherein $R^1$ in the compound containing at least one ester grouping of the general formula

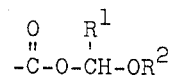

(component II) stands for methyl.

10. A process as claimed in claim 1, wherein the component (II) is a polymer, polycondensate or polyadduct to which at least one radical of the general formula

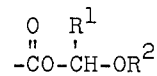

is attached.

11. A process as claimed in claim 1, wherein the component (II) comprises at least one compound selected from the group consisting of di-(1-methyl-2-oxabutyl) maleate and di-(α-ethoxyethyl) adipate.

12. A process as claimed in claim 1, wherein the component (II) is a polymer containing polymerized units of at least one compound selected from the group consisting of α-ethoxyethyl acrylate, α-ethoxy methacrylate and butyl-α-ethoxyethyl maleate.

* * * * *